(12) United States Patent
Elsasser et al.

(10) Patent No.: US 10,518,485 B2
(45) Date of Patent: ***Dec. 31, 2019

(54) METHOD FOR PRODUCING PLASTICS CONTAINERS

(71) Applicant: KAUTEX TEXTRON GMBH & CO. KG, Bonn (DE)

(72) Inventors: Carsten Elsasser, Pulheim (DE); Jochen Hild, Bonn (DE); Markus Hutzen, Sankt Augustin (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 312 days.

This patent is subject to a terminal disclaimer.

(21) Appl. No.: 15/419,219

(22) Filed: Jan. 30, 2017

(65) Prior Publication Data

US 2017/0203502 A1 Jul. 20, 2017

Related U.S. Application Data

(63) Continuation of application No. 14/234,048, filed as application No. PCT/EP2012/002613 on Jun. 20, 2012, now Pat. No. 9,555,581.

(30) Foreign Application Priority Data

Jul. 20, 2011 (DE) ...................... 10 2011 0108 026

(51) Int. Cl.
*B29C 65/00* (2006.01)
*B29C 65/60* (2006.01)
(Continued)

(52) U.S. Cl.
CPC ........ *B29C 66/976* (2013.01); *B29C 49/0047* (2013.01); *B29C 49/04* (2013.01);
(Continued)

(58) Field of Classification Search
None
See application file for complete search history.

(56) References Cited

U.S. PATENT DOCUMENTS 4,490,315 A 12/1984 Charlebois et al.
9,555,581 B2 * 1/2017 Elsasser ................ B29C 65/603

FOREIGN PATENT DOCUMENTS

CA 2641463 A1 8/2007
DE 102006006469 A1 8/2007
(Continued)

OTHER PUBLICATIONS

PCT International Search Report and Written Opinion dated Oct. 12, 2012, received in corresponding PCT Application No. PCT/EP12/02613, 9 pgs.

*Primary Examiner* — Monica A Huson
(74) *Attorney, Agent, or Firm* — Grossman, Tucker, Perreault & Pfleger, PLLC

(57) ABSTRACT

The invention relates to a method for producing plastics containers from thermoplastics with inserts which, by exploiting the heat of plasticization, are connected during shaping of the plastics container by a material bond and/or interlocking connection to the container wall, wherein the method provides the use of at least one opening on the insert, which opening forms a melt duct or melt inlet and/or melt passage for plasticized or plastic material of the container wall, wherein the method is distinguished in that the opening is monitored as a reference opening by optical and/or sensory means during the production of the connection, wherein the degree of penetration of the opening with thermoplastic from the container wall is used as a measure of the quality of the connection.

40 Claims, 13 Drawing Sheets

Figure 1:
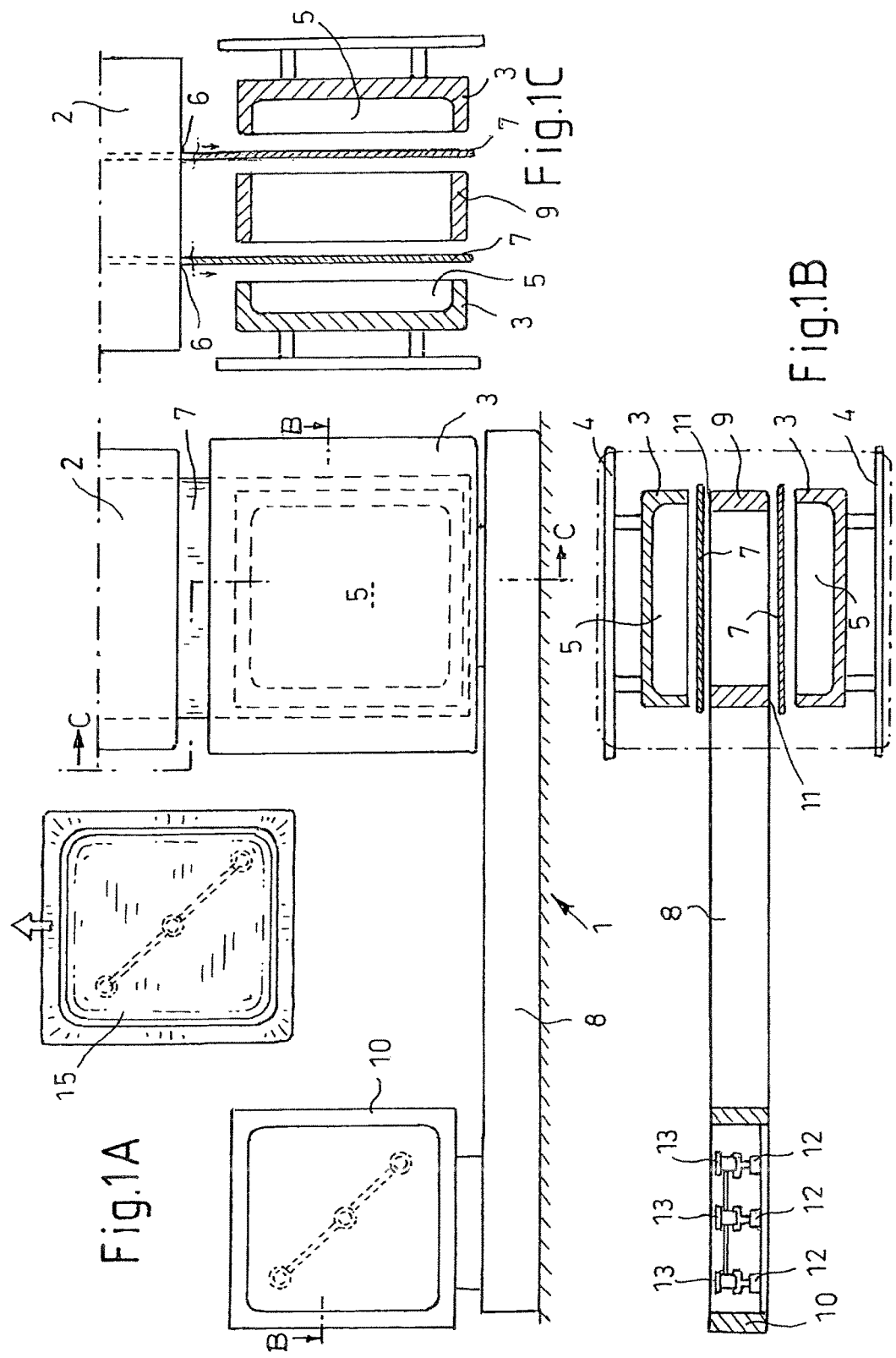

(51) Int. Cl.
  *B29C 69/00*   (2006.01)
  *B29C 51/12*   (2006.01)
  *B29C 51/26*   (2006.01)
  *B29C 65/02*   (2006.01)
  *B29C 49/00*   (2006.01)
  *B29C 49/78*   (2006.01)
  *B29C 49/04*   (2006.01)
  *B29C 49/20*   (2006.01)
  B29L 31/00   (2006.01)
  B29K 23/00   (2006.01)

(52) U.S. Cl.
  CPC .............. *B29C 49/20* (2013.01); *B29C 49/78* (2013.01); *B29C 51/12* (2013.01); *B29C 51/267* (2013.01); *B29C 65/028* (2013.01); *B29C 65/603* (2013.01); *B29C 65/608* (2013.01); *B29C 65/609* (2013.01); *B29C 66/1122* (2013.01); *B29C 66/1312* (2013.01); *B29C 66/21* (2013.01); *B29C 66/30325* (2013.01); *B29C 66/532* (2013.01); *B29C 66/54* (2013.01); *B29C 66/61* (2013.01); *B29C 66/71* (2013.01); *B29C 66/7234* (2013.01); *B29C 66/83221* (2013.01); *B29C 66/91221* (2013.01); *B29C 66/97* (2013.01); *B29C 66/972* (2013.01); *B29C 69/004* (2013.01); B29C 2049/0057 (2013.01); B29K 2023/065 (2013.01); B29L 2031/712 (2013.01); B29L 2031/7172 (2013.01); B29L 2031/737 (2013.01)

(56) References Cited

FOREIGN PATENT DOCUMENTS

| | | |
|---|---|---|
| DE | 102006042065 A1 | 3/2008 |
| FR | 2937581 A1 | 4/2010 |
| JP | H02231127 A | 9/1990 |
| JP | H1182856 A | 3/1999 |

* cited by examiner

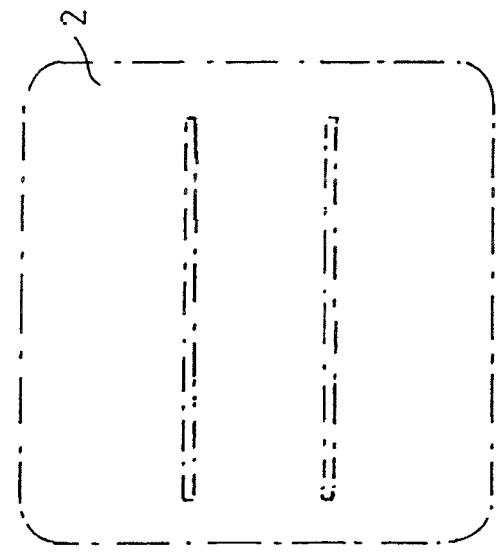
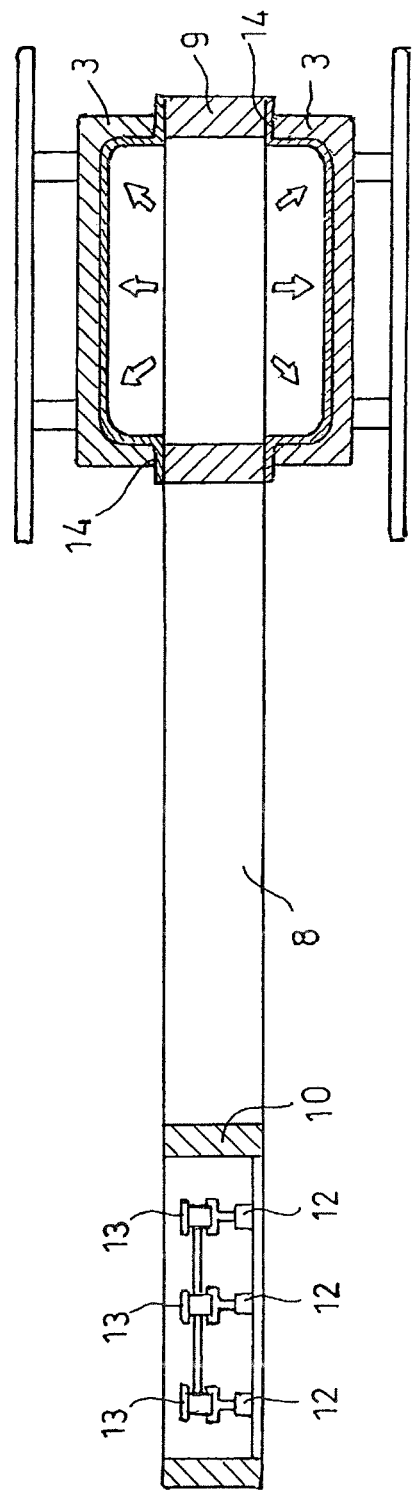
Fig. 3

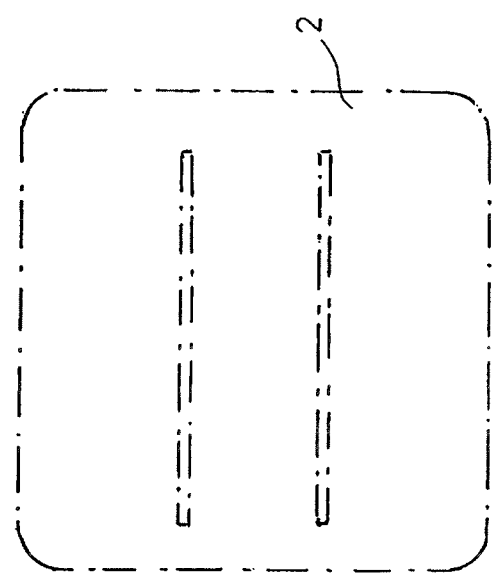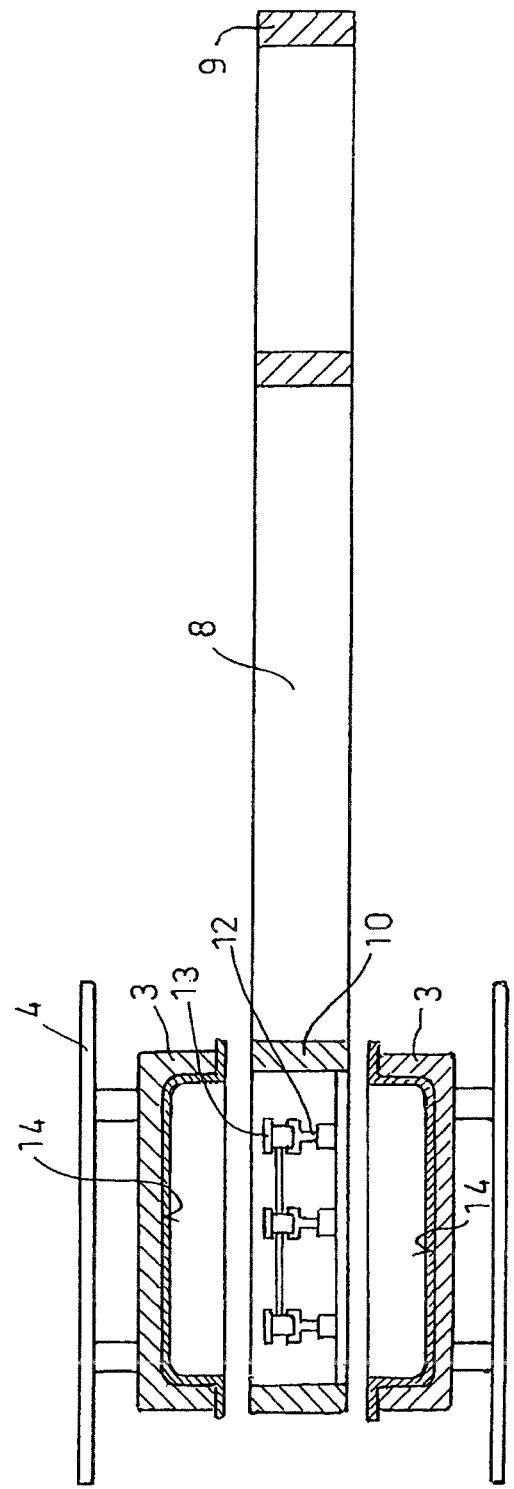
Fig.5

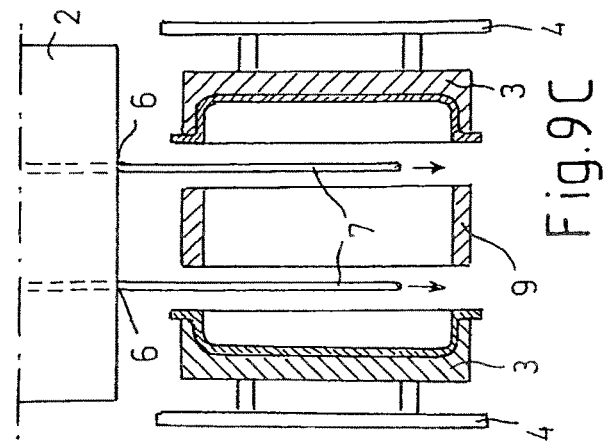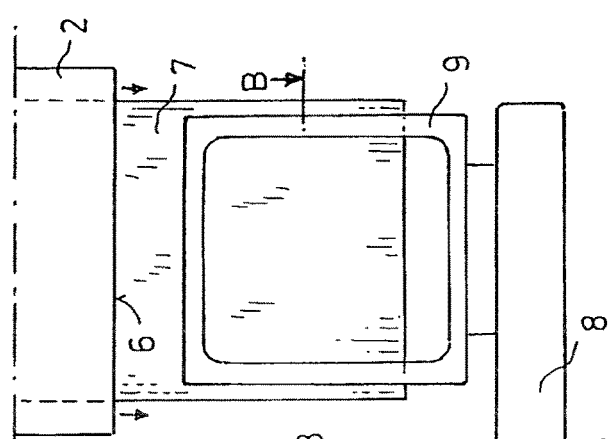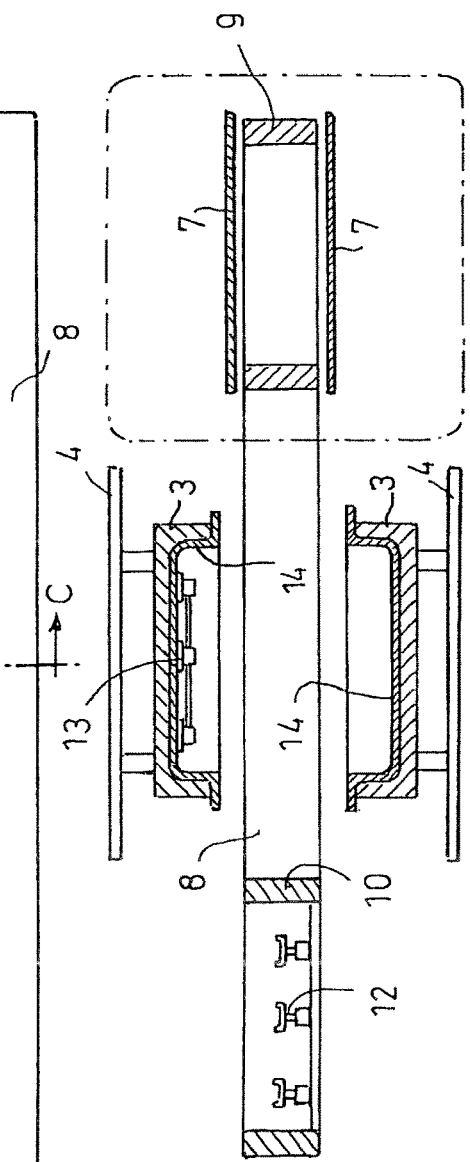

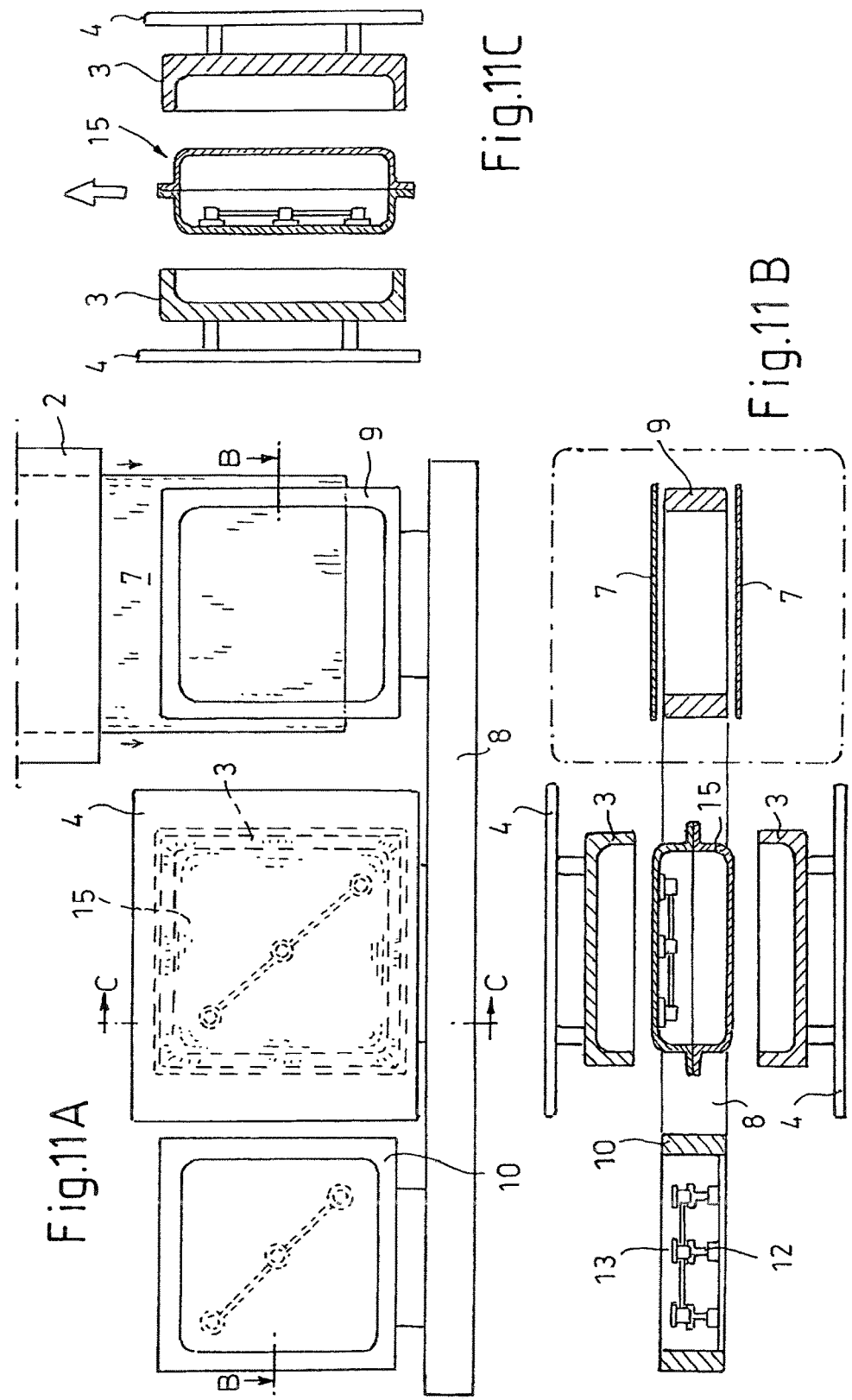

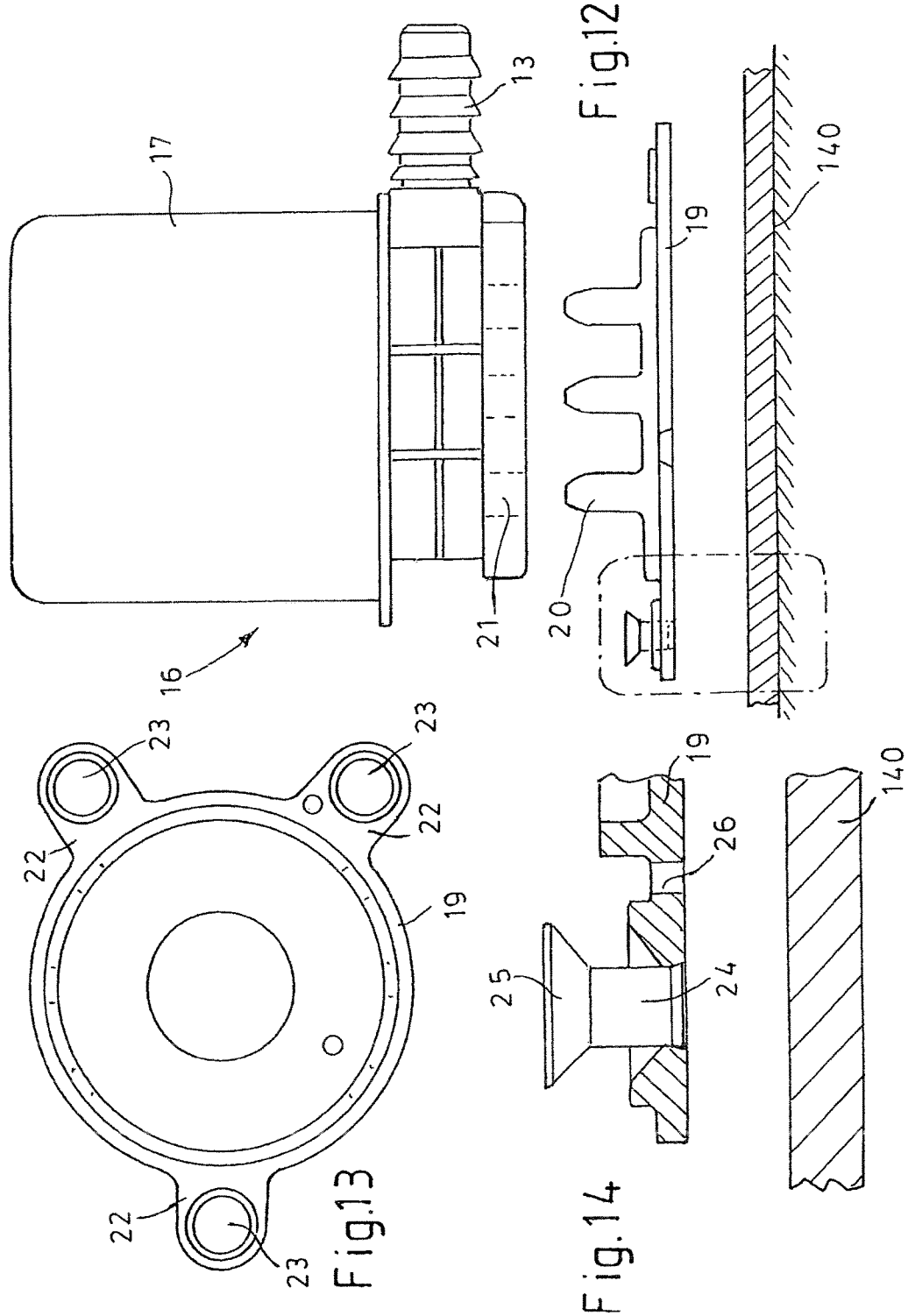

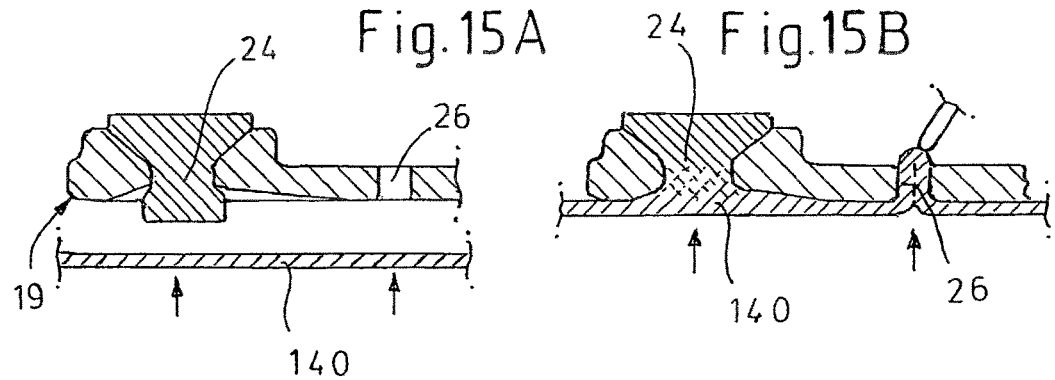
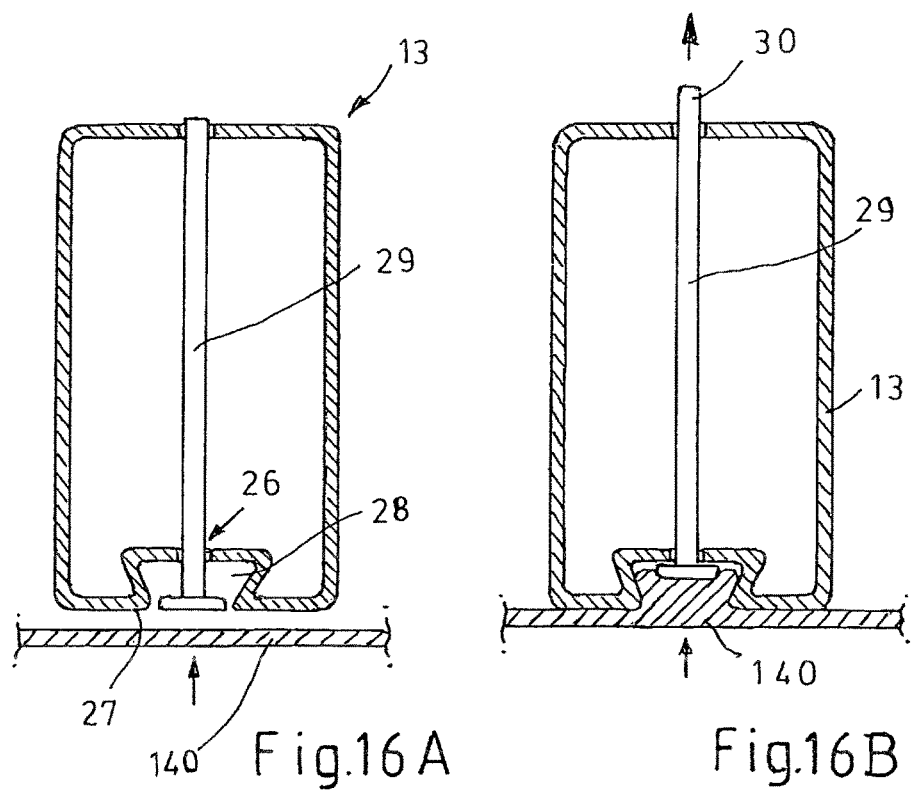

METHOD FOR PRODUCING PLASTICS CONTAINERS

The invention relates to a method for producing plastics containers from thermoplastics with inserts which, by utilizing the heat of plasticization, are connected during shaping of the plastics container by a material bond and/or interlocking connection to the container wall, wherein the method provides the use of at least one opening on the insert, which opening forms a melt duct or melt inlet and/or melt passage for plasticized or plastic material of the container wall.

Such a method is known for example from DE 10 2006 006 469 A1. The method described therein involves the production of an item enclosing inserts as a hollow article from a thermoplastic. The method involves extruding one or more web-form or tubular parisons of a plasticized plastics material between the opened parts of a cavity-forming mold, wherein at least one insert to be enclosed in the finished item is placed between the parts of the mold, and the mold is closed around the parisons. Within the closed mold, the parisons are shaped to form a hollow article, wherein, during or immediately after shaping, the insert is pressed against the inner wall of the item in the plastic state, such that the plastics material of the hollow article passes through and flows behind at least one recess or opening in the insert, such that a kind of in situ "riveting" of the insert is achieved with the assistance of the hot, plastic material of the container wall. If the insert is compatible with the container wall, it is simultaneously also welded with the container wall, such that said insert is fixed to the container wall both by an interlocking connection and by a material bond.

It has surprisingly been found that such a rivet-like connection between insert and container may be subjected to relatively high loads.

In particular if the container takes the form of a fuel tank, the inserts located therein must be capable of absorbing relatively high forces even under rapid acceleration and deceleration and during cornering, such forces also being generated by the mass of the fuel sloshing to and fro in the fuel tank. Reliable fastening is therefore indispensable.

The method according to DE 10 2006 006 469 A1 is entirely satisfactory in this respect, but it is virtually impossible to assess the quality of the connection point during or even after manufacture of the container. This is in particular because the containers which were produced by the method described in DE 10 2006 006 469 A1 have only relatively small openings provided in them, which complicates visual inspection of all the inserts in the container.

It is therefore desirable to modify the production method in such a way that particularly simple quality control of the connection between the inserts and the container wall is possible.

It is therefore an object of the invention to improve a method of the above-mentioned type in such a manner that relatively simple and reliable quality monitoring of the connection of inserts to the wall of the plastics container is possible.

Said object is achieved by a method for producing plastics containers from a thermoplastic with at least one insert which, by utilizing the heat of plasticization, is connected during shaping of the plastics container by a material bond and/or interlocking connection to the container wall, wherein the method provides the use of at least one opening on the insert which forms a melt duct and/or melt inlet and/or melt passage for plasticized or plastic material of the container wall, wherein the method is in particular distinguished in that the opening is monitored as a reference opening by optical and/or sensory means during the production of the connection and wherein the degree of penetration of the opening with thermoplastic from the container wall is used as a measure of the quality of the connection.

Such quality monitoring is also meaningful and advantageous in the event that the insert is to be connected to the container wall solely by a material bond in the manner of welding. In this case, the degree of penetration of the reference opening may, for example, serve as a measure of whether the contact pressure required during welding was maintained. Factors which are of the essence when welding plastics materials are the compatibility of the materials to be welded in terms of being plastics of the same kind, the temperature in the region of the welded connection, the joining time and the contact pressure during production of the weld.

The invention makes use of the detection of the mass displaced by the insert or passing therethrough by sensors, sensing means or optical/visual measuring means as a reference for the quality of the connection achieved with the insert and the wall of the plastics container. For example, the diameter of a melt head protruding from the reference opening may be measured optically, alternatively it is possible and meaningful to measure the height to which the melt column rises in the reference opening. All measurement or monitoring operations conveniently proceed on-line during the production of the plastics container, i.e. in real time, such that, in the event of inadequate quality of the connection, the plastics container may be removed immediately from the production line. A reference opening on one insert may, of course, also permit conclusions to be drawn regarding the quality of the connection of other inserts to the container wall. According to the invention, in a plastics container with a plurality of inserts provided on the container wall thereof, only one single reference opening on one single insert is used for this purpose, in order to enable quality monitoring/quality control of the connection of other inserts to the plastics container.

An opening which opens into a cavity of a sensor housing may also serve as reference opening. Such a sensor housing may for example be provided on an insert. The sensor housing may here house a sensor which is lost on installation in the container.

The plastics container according to the invention may in principle take the form of a fuel tank. Inserts which may for example be considered are surge tanks, level sensors, vent valves, fastening feet for lines or the like.

The thermoplastic provided may for example be a multilayer material based on HDPE (High Density PolyEthylene) with barrier layers for hydrocarbons.

An advantageous embodiment of the method according to the invention is distinguished in that at least one fastening opening is provided on the insert, through which opening plastics material of the container wall in a plastic state passes to produce the connection, wherein the method makes use of the degree of penetration of the reference opening with thermoplastic as a measure of the degree of penetration of the fastening opening. A hole or a bore need not necessarily be provided as the fastening opening, but the insert may instead be provided, for example, with one or more profiles which form undercuts on the side thereof which faces the container wall. Dovetail profiles may, for example, be considered here.

Conveniently, the sole purpose of the reference opening is quality monitoring and it has absolutely no fastening function.

A preferred variant of the method according to the invention provides that at least one temperature sensor or at least one measuring electrode, which generates a measurement signal when a predetermined degree of penetration is achieved, is arranged in the reference opening or downstream of the reference opening in the direction of flow. If, for example, a temperature sensor comes into contact with the hot melt, this contact results in a major increase in temperature at the measurement sensor.

Alternatively or additionally, at least one melt-displaceable body in the form of a piston or pin may be provided in the reference opening, said body either enabling visual inspection of the quality of the connection or in turn deflecting a switch or probe. Alternatively, the movement of a pin or plunger may be detected by means of a light barrier or by means of a camera. The melt rising up in or emerging from a reference opening may be detected with a light barrier or also by means of a camera.

One advantageous variant of the invention provides shaping at least two planar, web-form parisons of a plasticized thermoplastic in a multipart, cavity-forming mold to form mutually complementary shells, and joining the shells together to form a substantially closed hollow article, wherein the parisons are placed between parts of the mold which in each case comprise sub-cavities, the parts of the mold are closed against a mold divider arranged between the parisons and, using differential pressure, the parisons are inserted into the sub-cavities and shaped, wherein at least one insert is fastened onto at least one shell after and/or during shaping thereof, and the shells are joined together to form a closed hollow article by closing the molds.

The extrudates in web or piece form may for example be produced as multilayer coextrudates on an extrusion installation with an extruder head with flat film dies. The extruder head may be arranged above a multipart mold. One particularly advantageous variant of this manufacturing method provides that, once the shells have been shaped, the molds are opened in a separate method step, at least one insert is fastened to the shells and the shells are joined to one another to form a finished hollow article by reclosing the molds.

The method according to the invention has the advantage that only a simple mold divider, which only need provide a sealing function, is required for shaping the shells. The structural depth of the mold divider may be designed independently of the location and arrangement of the inserts to be introduced into the hollow article, such that it is no longer necessary to guide extruded parisons in piece or web form from above the molds in the direction of gravity. The parisons may be extruded at the distance from one another predetermined by the extruder head, without having to be maintained or guided at this distance, in particular by the use of roller conveyors, manipulators, grippers, heated rods or the like. This is in particular advantageous when using an extruder head as described in DE 10 2006 042 065 A1, in which a tubular melt stream of the coextrudate is divided by a corresponding division of the flow channel within the extruder head into two substantially planar melt streams in web form.

The method furthermore has the advantage that the one or more inserts to be introduced into the hollow article or fuel tank may be manipulated with the mold open.

For example, an insert may be introduced by means of conventional 3D manipulators, which may be set up at an appropriate location on blow molding machine.

In this case, a camera may for example be arranged on a manipulator, by means of which the quality of the connection of the insert to the container wall is monitored. Alternatively, one or more cameras may be arranged on the mold itself.

As mentioned above, the shells are preferably shaped by utilizing the first heat of the extrudate, i.e. utilizing the heat of plasticization from extrusion. This heat is likewise used for connecting the insert in question to the container wall by a material bond and/or interlocking connection. Heating the insert prior to connection with the container wall, for example by welding plates, infrared heating elements or the like, is not ruled out here.

The invention will be explained below with reference to an exemplary embodiment shown in the drawings.

In the figures:

FIG. 1a is a schematic representation of a device according to the invention at the start and at the end of a manufacturing cycle, FIG. 1b is a plan view of the arrangement shown in FIG. 1a, FIG. 1c is a partial section along the lines C-C in FIG. 1

Figure 2:
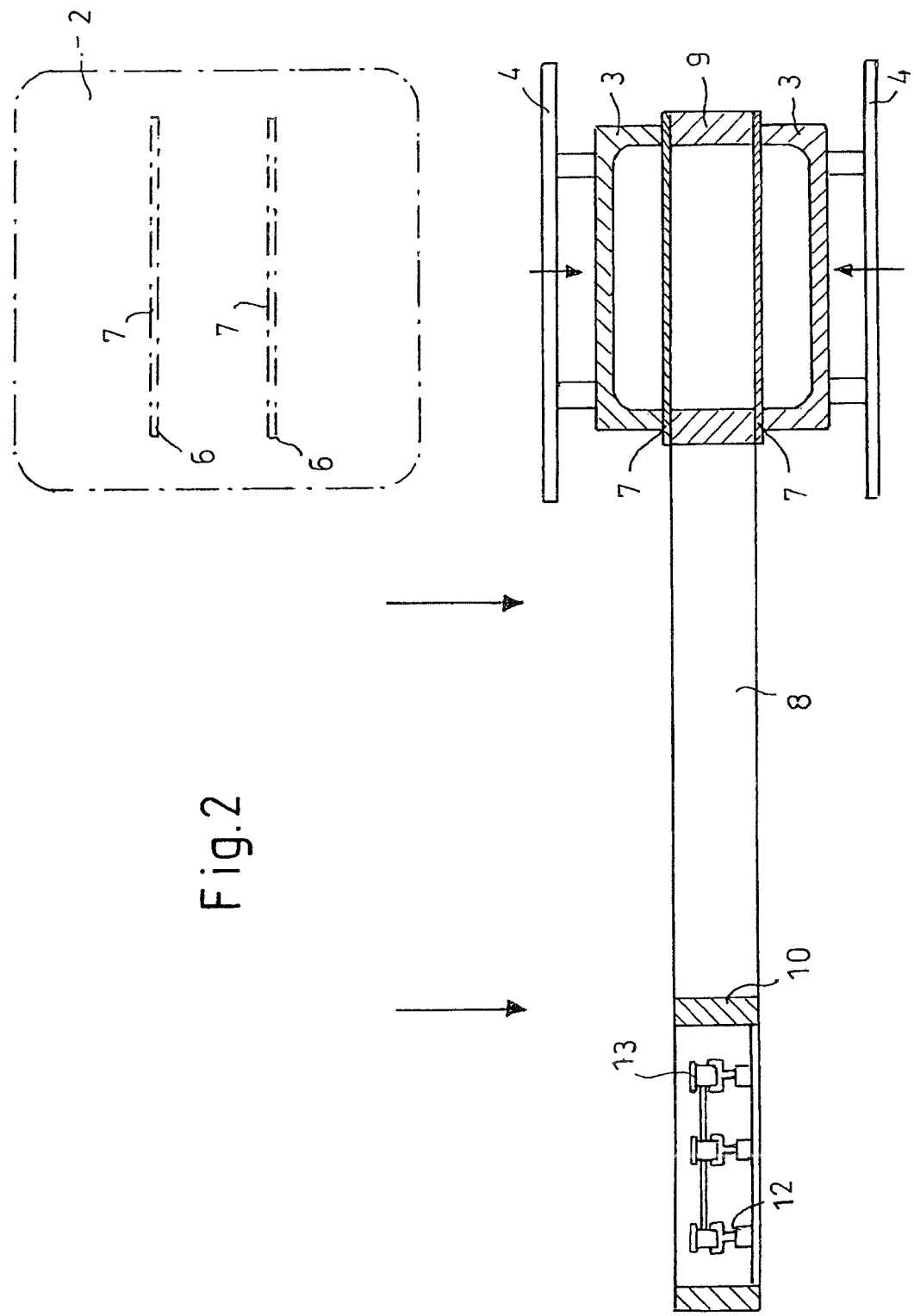
Figure 4:
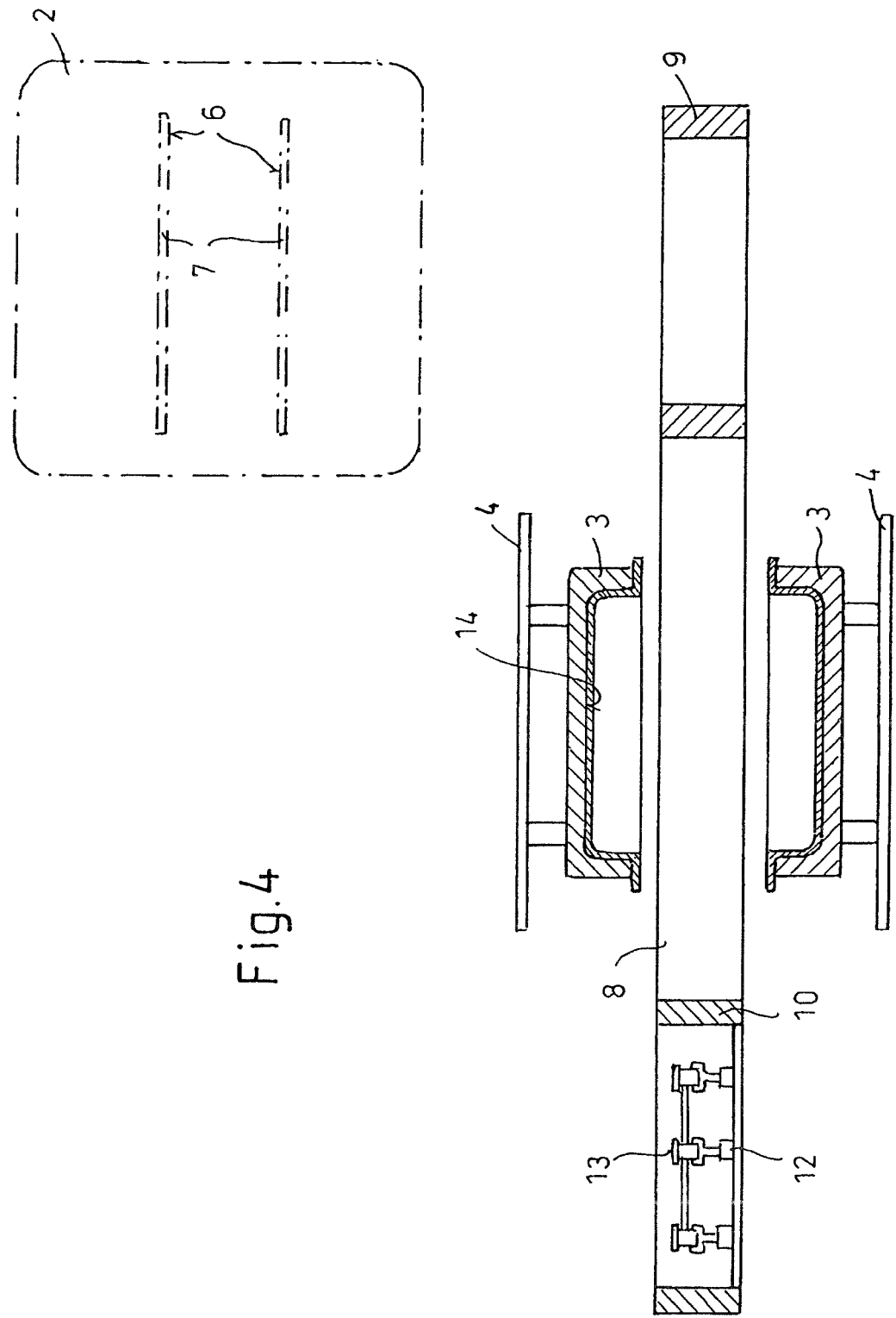
Figure 6:
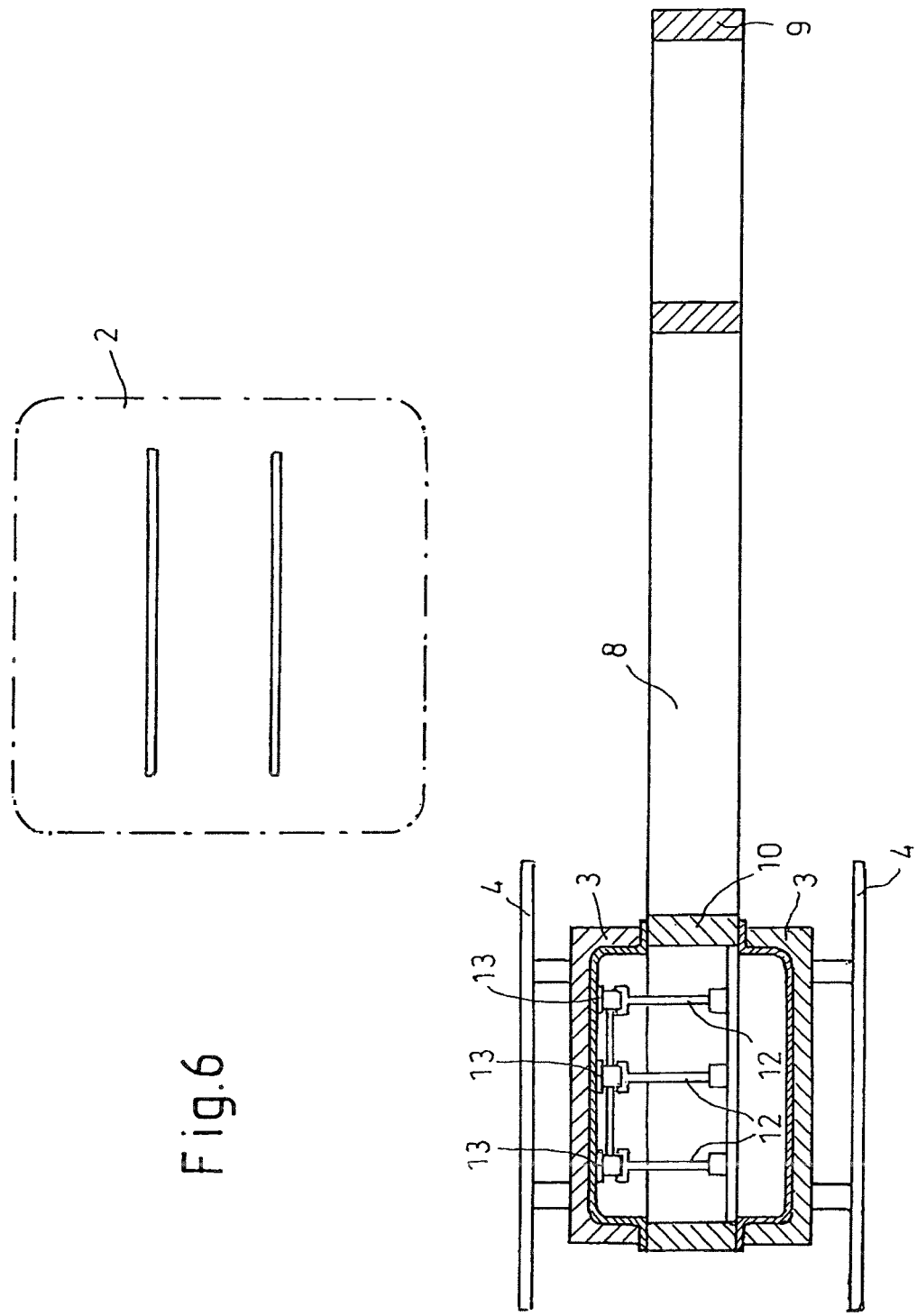
Figure 7:
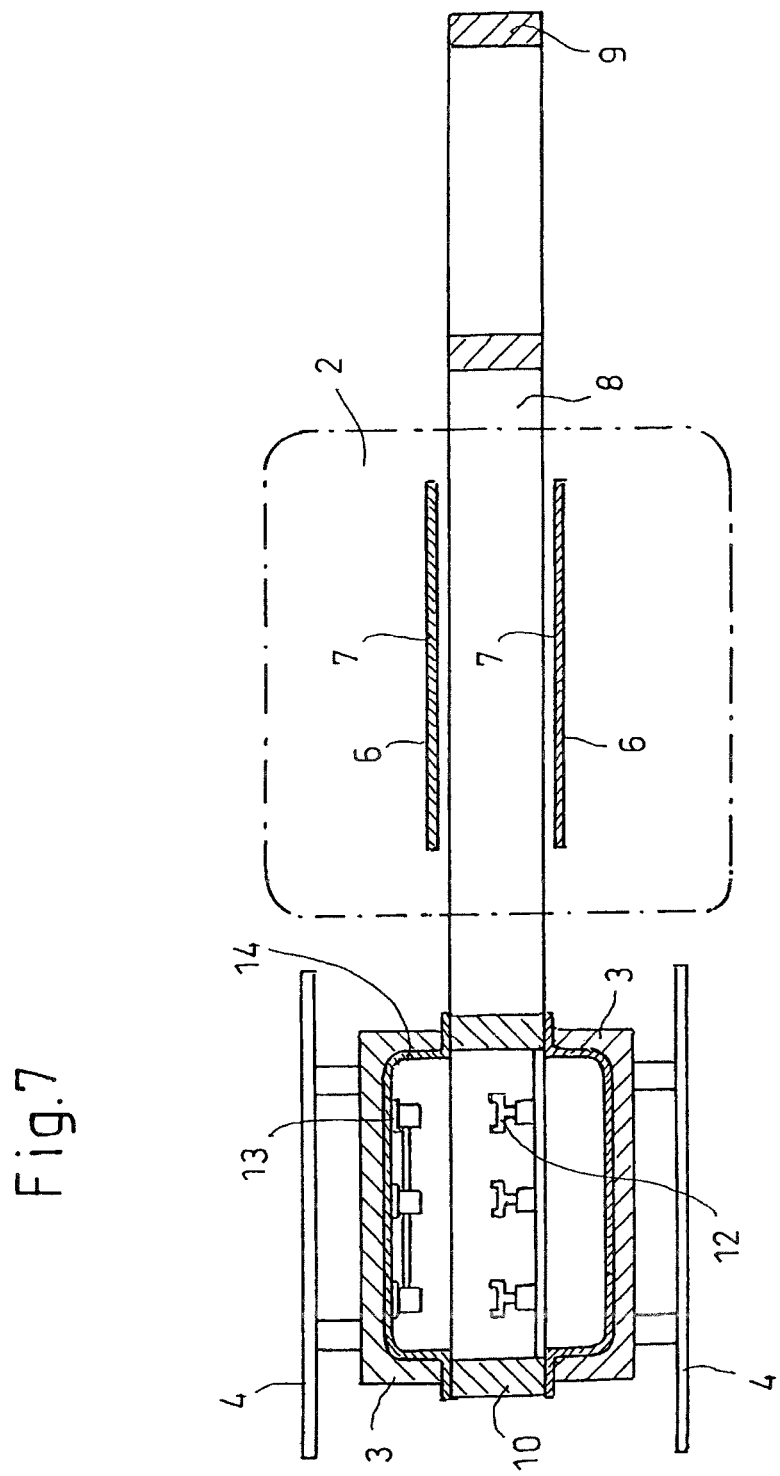
Figure 8:
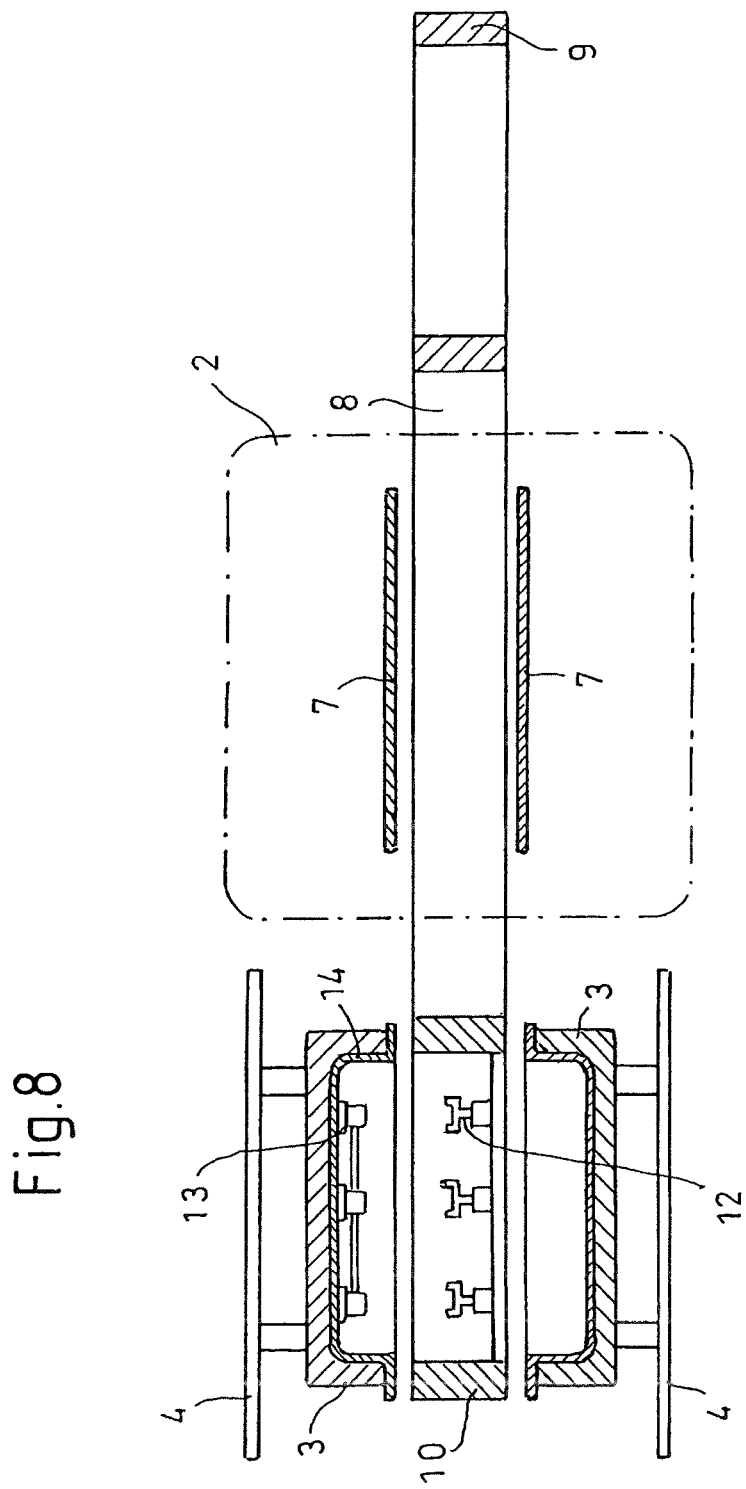
Figure 10:
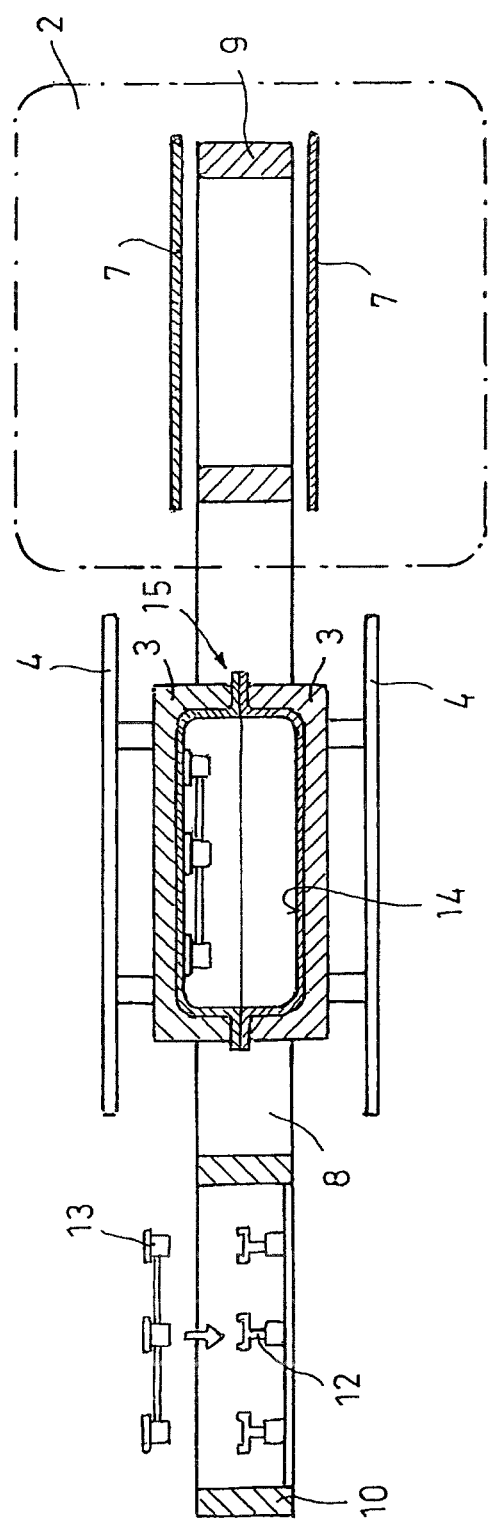

FIG. 2 is a view corresponding to FIG. 1b, in which the molds are closed against a mold divider arranged between the parisons, FIG. 3 shows the shaping of the parisons into shells, FIG. 4 is a plan view of the open molds after shaping the shells, FIG. 5 is a view of the open molds immediately prior to insertion of the inserts, FIG. 6 is a plan view of the closed molds on insertion of the inserts, FIG. 7 is a plan view of the closed molds after insertion of the inserts, FIG. 8 is a plan view of the open molds after insertion of the inserts, FIGS. 9a-9c are views corresponding to FIGS. 1a-1c immediately prior to mold closure for the purpose of joining the shells together to form a finished item, FIG. 10 is a plan view of the closed molds with the finished item, FIGS. 11a-11c are views corresponding to FIGS. 1a-1c illustrating the removal of the finished items, FIG. 12 is an exploded view of an insert according to the invention, FIG. 13 is a view of the fastening base of the insert, FIG. 14 is detail view III in FIG. 1, which in particular explains the arrangement of the reference bore, FIGS. 15a-15b show other views explaining the reference bore, FIGS. 16a-16b show an alternative development of the insert with a displaceable detector member in the form of a pin arranged in the reference bore.

Reference is firstly made to FIGS. 1a-1b, which show a schematic view of a blow molding mold 1 and of an extruder head 2 for carrying out the method according to the invention. The blow molding mold 1 comprises two blow mold halves 3, which are fastened in known manner onto mold platens 4 and may be moved away from and towards one another for the purposes of an opening and closing movement. Although the term "blow mold halves" was used above, it falls within the scope of the invention if the individual mold parts, which in each case form sub-cavities 5, are of multipart construction. Each of the blow mold halves 3 need not necessarily form half of the mold or of the impression/cavity. The parting surface of the blow mold halves 3 likewise need not necessarily divide the mold geometrically in half.

The mold platens 4 are part of a machine base frame which is not shown in greater detail and is mobile relative to the stationarily arranged extruder head 2, as is indicated in the drawings.

The extruder head 2 is shown in highly simplified form in the drawings; it comprises two flat film dies 6, from which parisons 7, which extend in a straight line into the plane of the drawing, are in each case continuously extruded in suspended manner, i.e. in the direction of gravity, in piece or web form. The parisons 7 preferably in each case consist of an extrudate with a total of six layers comprising a carbon black-colored outer HDPE layer, a recycled (regrind) layer based on HDPE, an EVOH barrier surrounded on both sides with coupling agent and a further uncolored HDPE layer. The coupling agent layers may for example be LDPE-based.

In addition to the machine base frame (not shown), the blow molding mold 1 according to the invention comprises a machine frame 8, which is mobile relative to the machine base frame and transversely of the opening and closing movement of the mold platens 4. A mold divider 9 and a component carrier 10 are arranged spaced from one another on the machine frame 8.

The mold divider 9 substantially takes the form of a sealing frame, the peripheral sealing faces 11 of which define a peripheral contour which approximately follows the boundary of the sub-cavities 5 of the blow mold halves 3.

The component carrier 10 likewise takes the form of a central frame, within which are arranged individual component holders 12 in the form of pneumatic piston-cylinder arrangements with fastening means.

The drawings show the structural depth of the mold divider 9 and of the component carrier or central frame 11 to be approximately equal, this specifically being for purposes of simplification. The structural depth of the mold divider 9 is in fact smaller than that of the component carrier 10. In the simplest case, the mold divider 9 may take the form of a simple plate, optionally with means for applying blowing pressure to the cavity.

The distance between the component carrier 10 and the mold divider 9 on the machine frame 8 approximately corresponds to (greater than or equal to) the width of the mold clamping frame or the mold platens 4.

As already mentioned, it may also be provided for the component carrier 10 and the mold divider 9 to be arranged mobile relative to one another on the machine frame. In this case, the movement range must be greater than or equal to the width of the mold platens 4.

FIGS. 1a-1b show the blow molding mold 1 respectively at the end and at the start of an operating cycle. Such an operating cycle firstly involves the continuous extrusion of the parisons 7 to a length which approximately corresponds to the height of the blow mold halves 3, as shown in FIG. 1c. The parisons 7 are extruded between the open blow mold halves 3, specifically in each case between a blow mold half 3 and the mold divider 9 arranged between the blow mold halves 3. In a further method step shown in FIG. 2, the blow mold halves 3 close against the mold divider 9 arranged therebetween, pinching off and/or severing the parisons 7 at the extruder head 2, optionally with the assistance of further tools for separating the continuously extruded parison 7. While the blow mold halves 3 are closing, the machine base frame below the extruder head moves away, as indicated in FIG. 2. The cavity or impression of the blow molding mold 1 is closed, the mold divider 9 here absorbing the clamping forces of the blow mold halves 3 and simultaneously sealing the cavity of the blow molding mold 1. By applying a vacuum and/or positive pressure, the parisons 7 are laid in the sub-cavities 5 of the blow mold halves 3 and shaped, as shown in FIG. 3. The blow mold halves are opened and, in the plan view, moved leftwards relative to the machine frame 8, as shown in FIG. 4. It is here immaterial whether the machine frame 8 is mobile relative to the machine base frame and relative to the blow mold halves 3 or whether the blow mold halves 3 and the mold platens 4 are mobile relative to the machine frame 8. This is freely selectable and depends on the space available for installing the blow molding mold 1 and the extruder head 2.

In a further method step (FIG. 5), the component carrier 10 is placed between the blow mold halves 3.

The blow mold halves 3 are then reclosed. Complete closure of the blow mold halves 3 in terms of sealing is not required during this operation. The step of closing the blow mold halves 3 against the component carrier 10 is therefore only optional.

In a further method step, the component holders 12 within the component carrier 10, which were provided with inserts 13 at the start of the operating cycle, are moved towards the shells 14 formed in the sub-cavities 5. With application of force from the lifting movement of the component holders 12, the inserts 13 are joined or fastened to the shells 14.

In the drawings, this operation is shown only in relation to one shell 14, but the invention should be taken to mean that inserts 13 may be fastened to one or both of the shells 14.

Such fastening may for example proceed by riveting in the manner as is for example described in German patent application DE 10 2006 006 469 A1, to the full content of which reference is made for the purposes of disclosure.

Finally, the component holders 12 are retracted into their starting position (FIG. 6), the blow molding mold 1 is opened, i.e. the blow mold halves 3 are moved apart from one another (FIG. 8). The mold platens 4 are moved into the starting position shown in FIG. 9b between the mold divider 9 and the component carrier 10, then the blow mold halves complete a closing movement in which the shells 14 arranged therein are welded together at the edges (FIG. 10). Meanwhile, the mold divider 9 is already placed between the parisons 7 (another cycle). In the meantime, the component holders 12 are provided with inserts 13.

Finally, the blow mold halves 3 are opened (FIG. 11b) and the finished item provided with inserts 13 in the form of a fuel tank 15 is lifted out of the open mold (FIG. 11b, FIG. 1a).

An insert 13 in the form of a vent valve 16 is shown by way of example in FIG. 13. The vent valve 16 comprises a valve housing 17 with a nipple 18 for connecting a vent line and a fastening base 19, which is snapped/latched to the valve housing 17 via latching tabs 20, which enter corresponding latching recesses 21.

The fastening base 19 of the vent valve 16 is provided with three fastening lugs 22, each of which comprises an opening 23. The opening 23 takes the form of a countersunk, circular hole and accommodates a rivet pin 24 which comprises a countersunk head 25 with a contour corresponding to the countersink of the opening 23.

The rivet pin 24 consists of thermoplastic and was prefabricated by injection molding and, prior to insertion of the vent valve 16 into the fuel tank, was inserted in the relevant opening 23 of the fastening base 19.

The rivet pin 24 likewise consists of HDPE and, in this respect, is likewise compatible with the inner layer of container wall 140.

In the exemplary embodiment shown, the vent valve 16 is provided with a removable and latchable fastening base 19; in principle it may also be of one-piece construction.

In the method according to the invention, the fastening base 19 provided with rivet pins 24 is welded during the shaping of the container to the container wall by the rivet pins 24 which pass through the openings 23. The rivet pin 24 in question is driven by means of a suitable tool through the openings 23 into the still hot, plastic inner layer at melt temperature of the container wall, such that the shank of the rivet pins 24 fuses with the inner layer of the container wall and the countersunk head 25 of the rivet pin 24, on the other hand, fits completely into the opening 23.

The fastening base 19 with the rivet pins arranged thereon may, for example, be pressed by means of a punch-like device using a manipulator against the parisons 7 shaped in the sub-cavities 5.

The temperature in the region of the contact surface of the fastening base 19 and the contact pressure are decisive for the quality of the fastening.

For the purposes of quality monitoring, a reference opening 26 is provided in at least one fastening lug 22 of the fastening base 19, the diameter of which reference opening may for example be distinctly smaller than the diameter of the openings 23. This reference opening 26 forms a melt duct, through which the hot, plastic material of the parison 7 or the container wall still at melt temperature is driven through when the fastening base 19 is pressed into place. The degree of penetration of the reference opening 26 with thermoplastic may be used as a measure of the quality of the welded connection obtained. The degree of penetration of the melt through the reference opening may be detected in sensory means either optically or by touch. In the simplest case, a camera may, for example, be arranged on a manipulator for introducing the inserts 13.

Instead of the rivet fastening described above, it may also be provided that the openings 23 are provided not with rivet pins but are instead likewise passed through by the container wall material at melt temperature, such that a kind of in situ "riveting" of the insert 13 is achieved. For example, the plastics material at melt temperature which passes through the openings 23 of the insert 13 may form a widened rivet head which fixes the insert 13 or the fastening base 19 onto the container wall 140 in interlocking manner.

Another variant for fastening an insert 13 onto the container wall 140 is shown by way of example in FIG. 16. The insert 13 is provided on its side facing the container wall with a profiled bottom 27. The bottom 27 has a dovetail profile, such that when the bottom 27 of the insert 13 pressed into the container wall still at melt temperature or into the parison 7 lying in the sub-cavity 5, the material at melt temperature engages behind the undercut of the dovetail profile 28. A reference opening 26, into which a pin 29 is inserted, is additionally provided in the bottom 27 of the insert. The pin 29 passes completely through the insert 13, such that a top 30 of the pin 29 projecting out of the insert 13 is for example optically detectable.

The pin 29 may for example be provided with a winding in the interior of the insert 13, which winding is introduced into a coil body, such that for example the distance traveled by the pin 29 during production of the connection is electrically detectable.

LIST OF REFERENCE SIGNS

1 Blow molding mold
2 Extruder head
3 Blow mold halves
4 Mold platens
5 Sub-cavities
6 Flat film dies
7 Parisons
8 Machine frame
9 Mold divider
10 Component carrier
11 Sealing faces
12 Component holders
13 Inserts
14 Shells
15 Fuel tank (item)
16 Vent valve
17 Valve housing
18 Nipple
19 Fastening base
20 Latching tabs
21 Latching recesses
22 Fastening lugs
23 Opening
24 Rivet pin
25 Countersunk head
26 Reference opening
27 Bottom of the insert
28 Dovetail profile
29 Pin
30 Top of the pin
140 Container wall

What is claimed is:

1. A method for producing a plastic container, comprising:
heating a thermoplastic material;
shaping the thermoplastic material into a wall of the container;
providing at least one insert, wherein the at least one insert includes at least opening;
connecting the at least one insert to the wall of the container by at least one of a material bond with the thermoplastic material and an interlocking connection with the thermoplastic material;
monitoring the at least one opening with at least one sensory device during the connecting of the at least one insert to the wall of the container;
determining a degree of penetration of the at least one opening by the thermoplastic material; and
using the degree of penetration of the at least one opening by the thermoplastic material as a measure of quality of a connection between the thermoplastic material and the at least one insert.

2. The method according to claim 1, wherein:
the connecting of the at least one insert to the wall of the container by at least one of a material bond with the thermoplastic material and an interlocking connection with the thermoplastic material further comprises welding the at least one insert to the wall of the container to form a welded connection; and
the using of the degree of penetration of the at least one opening by the thermoplastic material as a measure of quality of a connection between the thermoplastic material and the at least one insert further comprises using the degree of penetration of the at least one opening by the thermoplastic material as a measure of quality of the welded connection between the thermoplastic material and the at least one insert.

3. The method according to claim 1, wherein:
the at least one opening is a reference opening;
the insert further comprises at least one fastening opening; and further comprising,
penetrating the reference opening with the thermoplastic material;
penetrating the fastening opening with the thermoplastic material; and
using the degree of penetration of the reference opening by the thermoplastic material as a measure of degree of penetration of the fastening opening by the thermoplastic material.

4. The method according to claim 1, wherein:
the connecting of the at least one insert to the wall of the container by at least one of a material bond with the thermoplastic material and an interlocking connection with the thermoplastic material further comprises connecting the at least one insert to the wall of the container with at least the interlocking connection.

5. The method according to claim 4, wherein:
the insert includes at least one fastening surface which forms the interlocking connection, and
the interlocking connection includes a fastening undercut.

6. The method according to claim 5, wherein:
the at least one fastening surface which forms the interlocking connection forms a surface of the fastening undercut.

7. The method according to claim 1, further comprising:
generating a signal with the sensory device when a predetermined degree of penetration of the at least one opening by the thermoplastic material is achieved.

8. The method according to claim 1, wherein:
the at least one sensory device is arranged in the at least one opening.

9. The method according to claim 1, wherein:
the at least one sensory device is arranged downstream of the at least one opening in a direction of a flow of the thermoplastic material.

10. The method according to claim 1, wherein:
the at least one sensory device comprises at least one of an optical sensory device, a temperature sensory device, a measurement sensory device and a contact sensory device.

11. The method according to claim 1, wherein:
the at least one sensory device comprises at least one of a temperature sensor, a measuring electrode, a light barrier and a camera.

12. The method according to claim 1, further comprising:
penetrating the at least one opening with the thermoplastic material; and
the determining of a degree of penetration of the at least one opening by the thermoplastic material further comprises measuring the degree of penetration of the at least one opening by the thermoplastic material.

13. The method according to claim 1, further comprising:
providing at least one displaceable body in the at least one opening;
penetrating the at least one opening with the thermoplastic material; and
the determining of a degree of penetration of the at least one opening by the thermoplastic material further comprises displacing the at least one displaceable body with the thermoplastic material penetrating the at least one opening and determining the displacement of the at least one displaceable body to determine the degree of penetration of the at least one opening by the thermoplastic material.

14. The method according to claim 1, wherein:
the at least one opening forms at least one of an inlet and a duct and a passage for the thermoplastic material.

15. The method according to claim 1, further comprising:
plasticizing the thermoplastic material with an extruder; and
the forming of the heated thermoplastic material into the wall of the container is performed by blow molding.

16. The method according to claim 1, wherein:
the shaping of the thermoplastic material into a wall of the container further comprises shaping at least two planar, web-form parisons of the thermoplastic material into mutually complementary shells providing the wall of the container;
the connecting of the at least one insert to the wall of the container further comprises connecting the at least one insert to at least one of the shells of the container; and
joining the shells together to form the container.

17. The method according to claim 16, wherein:
the connecting of the at least one insert to at least one of the shells of the container is performed at least one of during and after shaping the at least two planar, web-form parisons of the thermoplastic material into the mutually complementary shells; and
the connecting of the at least one insert to at least one of the shells of the container is performed before joining the shells together to form the container.

18. The method according to claim 1, wherein:
the at least one sensing device is attached to a mold to form the container or on a robot arm.

19. The method according to claim 1, wherein:
the container is a motor vehicle fuel tank; and
the at least one insert comprises at least one of a surge tank, a level sensor, a vent valve, a valve housing and a fastening base.

20. The method according to claim 5, wherein:
the fastening undercut is provided by a dovetail profile.

21. A method for producing a plastic container, comprising:
heating a thermoplastic material;
shaping the thermoplastic material into a wall of the container;
providing at least one insert, wherein the at least one insert includes at least opening;
connecting the at least one insert to the wall of the container by at least one of a material bond with the thermoplastic material and an interlocking connection with the thermoplastic material;
monitoring the at least one opening with at least one sensory device during the connecting of the at least one insert to the wall of the container;
determining a degree of penetration of the at least one opening by the thermoplastic material; and
using the degree of penetration of the at least one opening by the thermoplastic material to indicate a presence of a connection between the thermoplastic material and the at least one insert.

22. The method according to claim 21, wherein:
the connecting of the at least one insert to the wall of the container by at least one of a material bond with the thermoplastic material and an interlocking connection with the thermoplastic material further comprises welding the at least one insert to the wall of the container to form a welded connection; and
the using of the degree of penetration of the at least one opening by the thermoplastic material to indicate a presence of a connection between the thermoplastic material and the at least one insert further comprises using the degree of penetration of the at least one opening by the thermoplastic material to indicate a presence of the welded connection between the thermoplastic material and the at least one insert.

23. The method according to claim 21, wherein:
the at least one opening is a reference opening;
the insert further comprises at least one fastening opening; and further comprising,
penetrating the reference opening with the thermoplastic material;
penetrating the fastening opening with the thermoplastic material; and
using the degree of penetration of the reference opening by the thermoplastic material as a measure of degree of penetration of the fastening opening by the thermoplastic material.

24. The method according to claim 21, wherein:
the connecting of the at least one insert to the wall of the container by at least one of a material bond with the thermoplastic material and an interlocking connection with the thermoplastic material further comprises connecting the at least one insert to the wall of the container with at least the interlocking connection.

25. The method according to claim 24, wherein:
the insert includes at least one fastening surface which forms the interlocking connection, and
the interlocking connection includes a fastening undercut.

26. The method according to claim 25, wherein:
the fastening undercut is provided by a dovetail profile.

27. The method according to claim 25, wherein:
the at least one fastening surface which forms the interlocking connection forms a surface of the fastening undercut.

28. The method according to claim 21, further comprising:
generating a signal with the sensory device when a predetermined degree of penetration of the at least one opening by the thermoplastic material is achieved.

29. The method according to claim 21, wherein:
the at least one sensory device is arranged in the at least one opening.

30. The method according to claim 21, wherein:
the at least one sensory device is arranged downstream of the at least one opening in a direction of a flow of the thermoplastic material.

31. The method according to claim 21, wherein:
the at least one sensory device comprises at least one of an optical sensory device, a temperature sensory device, a measurement sensory device and a contact sensory device.

32. The method according to claim 21, wherein:
the at least one sensory device comprises at least one of a temperature sensor, a measuring electrode, a light barrier and a camera.

33. The method according to claim 21, further comprising:
penetrating the at least one opening with the thermoplastic material; and
the determining of a degree of penetration of the at least one opening by the thermoplastic material further comprises measuring the degree of penetration of the at least one opening by the thermoplastic material.

34. The method according to claim 21, further comprising:
providing at least one displaceable body in the at least one opening;
penetrating the at least one opening with the thermoplastic material; and
the determining of a degree of penetration of the at least one opening by the thermoplastic material further comprises displacing the at least one displaceable body with the thermoplastic material penetrating the at least one opening and determining the displacement of the at least one displaceable body to determine the degree of penetration of the at least one opening by the thermoplastic material.

35. The method according to claim 21, wherein:
the at least one opening forms at least one of an inlet and a duct and a passage for the thermoplastic material.

36. The method according to claim 21, further comprising:
plasticizing the thermoplastic material with an extruder; and
the forming of the heated thermoplastic material into the wall of the container is performed by blow molding.

37. The method according to claim 21, wherein:
the shaping of the thermoplastic material into a wall of the container further comprises shaping at least two planar, web-form parisons of the thermoplastic material into mutually complementary shells providing the wall of the container;
the connecting of the at least one insert to the wall of the container further comprises connecting the at least one insert to at least one of the shells of the container; and
joining the shells together to form the container.

38. The method according to claim 37, wherein:
the connecting of the at least one insert to at least one of the shells of the container is performed at least one of during and after shaping the at least two planar, web-form parisons of the thermoplastic material into the mutually complementary shells; and
the connecting of the at least one insert to at least one of the shells of the container is performed before joining the shells together to form the container.

39. The method according to claim 21, wherein:
the at least one sensing device is attached to a mold to form the container or on a robot arm.

40. The method according to claim 21, wherein:
the container is a motor vehicle fuel tank; and
the at least one insert comprises at least one of a surge tank, a level sensor, a vent valve, a valve housing and a fastening base.

* * * * *